United States Patent Office 3,761,389
Patented Sept. 25, 1973

3,761,389
PROCESS OF CONVERTING ALIPHATICS TO AROMATICS
Louis Deane Rollmann, Princeton, N.J., assignor to Mobil Oil Corporation
No Drawing. Filed Aug. 28, 1972, Ser. No. 284,020
Int. Cl. C10g 35/06
U.S. Cl. 208—64                 10 Claims

ABSTRACT OF THE DISCLOSURE

Improvements in the known process for converting $C_2$ to 400° F. aliphatic streams by contacting such stream with a ZSM-5 type of catalyst at elevated temperatures and under relatively severe reaction conditions sufficient to convert at least 70% of the feed to a product with an aromatics yield of at least 20 grams per 100 grams of aromatizable feed; which improvement envisions carrying out the aromatization reaction in two stages in order to increase the proportion of alkyl substituted benzenes at the expense of benzene itself thereby increasing the weight yield of high octane products.

---

This invention relates to the conversion of aliphatics to aromatics. It more particularly refers to techniques for improving the weight yield of aromatics from this type of conversion.

It is known that under certain conditions, aliphatic hydrocarbon feedstocks can be converted to a mixed liquid and gaseous product in which the liquid is predominantly, over about 90%, aromatic while the gas is predominantly light paraffins. This process is the subject of U.S. patent application Ser. Nos. 153,855, filed June 16, 1971 and 253,942, filed May 17, 1972. According to these prior applications, a feed in the range of about $C_2$ to 400° F. is passed in contact with a ZSM-5 type of synthetic aluminosilicate molecular sieve catalyst at about 650 to 1500° F. at a space velocity equivalent to about 1 to 15 WHSV under such conditions that at least about 70% of the aromatizable feed is converted to a product having an aromatics yield of at least 30 grams per 100 grams of the non-aromatic portion of the feed. This liquid product has a very high octane number and is quite useful as a gasoline blend stock.

The catalyst used for this known process has been stated to be a ZSM-5 type of catalyst which includes ZSM-5, ZSM-8, ZSM-11 and other similarly behaving zeolites.

ZSM-5 is disclosed and claimed in copending application Ser. No. 865,472, filed Oct. 10, 1969; ZSM-8 is disclosed and claimed in copending application Ser. No. 865,418, filed Oct. 10, 1969 and ZSM-11 is disclosed and claimed in copending application Ser. No. 31,421, filed Apr. 23, 1970.

The family of ZSM-5 compositions has the characteristic X-ray diffraction pattern set forth in Table 1 hereinbelow. ZSM-5 compositions can also be identified, in terms of mole ratios of oxides, as follows:

$$0.9 \pm 0.2\ M_{2/n}O:W_2O_3:bYO_2:zH_2O$$

wherein M is a cation, n is the valence of said cation, W is selected from the group consisting of aluminum and gallium, Y is selected from the group consisting of silicon and germanium, z is from 0 to 40 and b is at least 5 and preferably 15–300. In a preferred synthesized form, the zeolite has a formula, in terms of mole ratios of oxides, as follows:

$$0.9 \pm 0.2 M_{2/n}:Al_2O_3:15-100SiO_2:zH_2O$$

and M is selected from the group consisting of a mixture of alkali metal cations, especially sodium and tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose X-ray diffraction pattern shows the following significant lines:

TABLE I

| Interplanar spacing $d$(A): | Relative intensity |
|---|---|
| 11.1±0.3 | S |
| 10.0±0.25 | S |
| 7.4±0.20 | W |
| 7.1±0.15 | W |
| 6.3±0.1 | W |
| 6.04±0.1 | W |
| 5.97±0.1 | W($d$) |
| 5.56±0.1 | W |
| 5.01±0.1 | W($d$) |
| 4.60±0.08 | W |
| 4.25±0.08 | W |
| 3.85±0.07 | VS($d$) |
| 3.71±0.05 | S($d$) |
| 3.64±0.05 | M |
| 3.04±0.04 | W |
| 2.99±0.03 | W($d$) |

NOTE.—($d$) = peak may appear as a doublet.

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 $I/I_o$, where $I_o$ is the intensity of the strongest line or peak, and $d$(obs.), the interplanar spacing in A, corresponding to the recorded lines, where calculated. In Table 1 the relative intensities are given in terms of the symbols E=strong, M=medium, W=weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 2

| | Broad | Preferred | Particularly preferred |
|---|---|---|---|
| OH/SiO$_2$ | 0.07–1.0 | 0.1–0.8 | 0.2–0.75 |
| R$_4$N$^+$(R$_4$N$^+$+Na$^+$) | 0.2–0.95 | 0.3–0.9 | 0.4–0.9 |
| H$_2$O/OH | 10–300 | 10–300 | 10–300 |
| YO$_2$/W$_2$O$_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90 to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM–5 is preferably formed as an aluminosilicate. The composition can be prepared utilizing materials which supply the elements of the appropriate oxide. Such compositions include, for an aluminisilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM–5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM–5 composition will vary with the nature of the reaction mixture employed.

ZSM–8 can also be identified, in terms of mole ratios of oxides, as follows:

$$0.9 \pm 0.2 M_{2/n}O : Al_2O_3 : 15\text{–}300\ SiO_2 : zH_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 M_{2/n}O : Al_2O_3 : 15\text{–}60\ SiO_2 : zH_2O$$

and M is selected from the group consisting of a mixture of alkali metal cations, especially sodium, and tetraethylammonium cations.

Zeolite ZSM–8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM–8 can be prepared from said hydroxide, sodium oxide, aluminum oxide, silica and water by reacting said materials in such proportions that the forming solution has a composition in terms of mole ratios of oxides falling within the following ranges:

SiO₂/Al₂O₃—from about 10 to about 200
Na₂O/tetraethylammonium hydroxide—from about 0.05 to .020
Tetraethylammonium hydroxide/SiO₂—from about 0.08 to 1.0
H₂O/tetraethylammonium hydroxide—from about 80 to about 200

Thereafter, the crystals are separated from the liquid and recovered. Typical reaction conditions consist of maintaining the foregoing reaction mixture at a temperature of from about 100° C. to 175° C. for a period of time of from about six hours to 60 days. A more preferred temperature range is from about 150 to 175° C. with the amount of time at a temperature in such range being from about 12 hours to 8 days.

ZSM–11 can also be identified, in terms of mole ratios of oxides, as follows:

$$0.9 \pm 0.3 M_{2/n}O : Al_2O_3 : 20\text{–}90\ SiO_2 : zH_2O$$

wherein M is at least one cation, n is the valence thereof and z is from 6 to 12. In a preferred synthesized form, the zeolite has a formula, in terms of mole ratios of oxides, as follows:

$$0.9 \pm 0.3 M_{2/n}O : Al_2O_3 : 20\text{–}90\ SiO_2 : zH_2O$$

and M is selected from the group consisting of a mixture of alkali metal cations, especially sodium, and tetrabutylammonium cations.

ZSM–11 can be suitably prepared by preparing a solution containing (R₄X)₂O, sodium oxide, an oxide of aluminum or galium, an oxide of silicon or germanium and water and having a composition, in terms of mole ratios of oxides, falling within the following ranges:

|  | Broad | Preferred |
| --- | --- | --- |
| YO₂/WO₂ | 10–150 | 20–90 |
| Na₂O/YO₂ | .05–0.7 | 0.05–0.40 |
| (R₄X)₂O/YO₂ | 0.02–0.20 | 0.02–0.15 |
| H₂O/Na₂O | 50–800 | 100–600 | wherein R₄X is a cation of a quaternary compound of an element of Group 5–A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100° C.–200° C. generally, but at lower temperatures, e.g. about 100° C. crystallization time is longer. Thereafter the crystals are separated from the liquid and recovered. The new zeolite is preferably formed in an aluminosilicate form.

An embodiment of this catalyst resides in the use of a porous matrix together with the ZSM–5 type family of zeolite previously described. The zeolite can be combined, dispersed, or otherwise intimately admixed with the porous matrix in such proportions that resulting products contain from 1 to 95% by weight and preferably from 10 to 70% by weight of the zeolite in the final composite.

The term "porous matrix" includes non-zeolitic inorganic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide, aggregates, pumice, firebrick, diatomaceous earths, alumina and inorganic oxides. Inorganic compositions, especially those comprising alumina and those of a siliceous nature are preferred. Of these matrices inorganic oxides such as clay, chemically treated clays, silica, silica alumina, etc. as well as alumina, are particularly preferred because of their superior porosity, attrition resistance and stability.

Techniques for incorporating the ZSM–5 type family of zeolites into a matrix are conventional in the art and are set forth in U.S. 3,140,253.

It is to be noted that when a ZSM–5 type zeolite is used in combination with a porous matrix, space velocities which may be set forth as parameters for this process are based on the ZSM–5 type zeolite alone and the porous matrix is ignored. Thus, whether a ZSM–5 type zeolite is used alone or in a porous matrix, the space velocities in all cases refer to the ZSM–5 type component.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM–5 type family of zeolites have been found to be especially active for aromatization if they have at least a portion of the original cations associated therewith replaced by any of a wide variety of other cations according to techniques well known in the art. Typical replacing cations would include hydrogen, ammonium, and metal cations, including mixtures of the same. Of the replacing cations, preference is given to cations of hydrogen, ammonium, rare earth, magnesium, zinc, calcium, nickel, and mixtures thereof. Particularly effective members of the ZSM-5 type family of zeolites are those which have been base exchanged with hydrogen ions, ammonium ions, zinc ions or mixtures thereof. Most especially zinc ZSM-5 is the best presently known catalyst for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. 3,140,249; 3,140,251; and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic component, such as zinc, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation, the zeolites are preferably washed with water and dried at a temperature ranging from 150° to about 600° F. and thereafter heated in air or inert gas at temperatures ranging from about 500° F. to 1500° F. for periods of time ranging from 1 to 48 hours or more. It is noted that this heat treatment can be carried out in situ, i.e. while the particular aromatization reaction is taking place, but it is preferred to carry it out as a separate step prior to carrying out the aromatization reaction.

Since the process has as its prime objective to upgrade the motor fuel value or octane number of the feedstock, it is of course desirable to maximize aromatics production by this process. In the past, however, this process has produced about equal quantities of light gas, $C_4^-$, product and liquid aromatics product. This aromatics liquid usually contains at least about 90% aromatics with a distribution of aromatic products such that toluene usually predominates with significant quantities of benzene and $C_8$ aromatics together with somewhat lower quantities of $C_9^+$ aromatics. From a gasoline additive product value point of view, the lower alkyl substituted aromatics are to be preferred as compared to the non-substituted benzene because they have as high octane values and have greater weight and volume per octane number.

It is therefore an object of this invention to provide an improved process for aromatizing aliphatics.

It is another object of this invention to provide an aromatization process in which alkylated benzenes of the $C_8^+$ variety are increased at the expense of benzene production.

It is a further object of this invention to provide an aromatization process which produces more alkylated benzene product than has been possible in the past without substantially decreasing the octane number or yield of the product.

Other and additional objects of this invention will become apparent from a consideration of this entire spefiication including the claims hereof.

In accord with and fulfilling these objects, one aspect of this invention resides in an aromatization process which comprises contacting, in the absense of added hydrogen, a feedstock comprising $C_2$ to 400° F. paraffins, olefins, napthenes and mixtures of at least some of these, which may or may not contain aromatics which are substantially inert to the aromatization conditions hereinafter set forth, in a first stage a ZSM-5 type of synthetic aluminosilicate molecular sieve zeolite under relatively severe reaction conditions of 800 to 1500° F., 1-35 atmospheres absolute, a space velocity equivalent to about 1 to 15 WHSV, a conversion of at least about 70% and an aromatics yield of at least about 20 grams per 100 grams of aromatizable components of the feedstock; contacting the product evolved from said first stage with a ZSM-5 type of synthetic alumino-silicate molecular sieve zeolite, which may be the same or different from the ZSM-5 zeolite used in the first stage, in a second stage under less severe reaction conditions of 500 to 800° F., 1-35 atmospheres absolute, a space velocity equivalent to about 1 to 20 WHSV and a conversion (of the first stage liquid product) of at least to 20%; and recovering a liquid product having an alkylated benzene to benzene ratio of at least about 4 and a total aromatics yield of at least about 30 grams per hundred grams of aromatizable component in the initial feedstock.

It is within the scope of this invention to operate the first and second stages with different catalysts, including different forms of the same catalyst. As noted above, although the first and second stage conditions recited overlap, they need not be either the same or consistent. For example, it is a preferred aspect of this invention to operate the first stage at about atmospheric pressure and the second stage at a somewhat elevated pressure. It is also considered to be quite practical to operate the second stage with the direct effluent of the first stage without intermediate resolution thereof. Thus the second stage may well be operated in the presence of added hydrogen in the sense that hydrogen is produced in the first stage and is therefore inherently included in the feed to the second stage if the first stage product is not resolved.

In addition, it is within the scope of this invention to operate the second stage with truly added hydrogen in addition to that inherently supplied as part of the first stage product, and to operate the second stage under a significant pressure so as to induce some hydrogenation activity in the second, or alkylation, stage.

A further aspect of this invention, which may indeed be used in order to fulfill the aspects recited above, is to admix reformate or reformer effluent under pressure and/ or containing free hydrogen directly with the first stage effluent, bring the mixture to the desired pressure and then subject the pressurized mixture to the second stage treatment. As an adjunct to this aspect of this invention, pressurizing the first stage product and/or adding hydrogen thereto may be limited to that provided by simply mixing reformate or reformer effluent with the first stage product to form a second stage feed having an equilibrium pressure and/or an equilibrium hydrogen content of the two admixed streams. The second stage should preferably operate at a hydrogen to hydrocarbon ratio of about 1 to 10.

The second stage catalyst preferably should contain, in addition to the ZSM-5 component thereof, a hydrogenation/dehydrogenation component thereof, a hydropalladium or rhenium. As used hereinafter, the term "second stage catalyst" includes the possibility of it having this added component whether specified or not.

It is preferred that the first stage catalyst be Zn ZSM-5, that the zinc in the Zn ZSM-5 catalyst be incorporated therein by impregnation followed by calcining. Additional metals may be added to the zinc- containing catalyst, such as copper, in order to ameliorate any zinc loss through vaporization or otherwise and/or to generally improve the aromatization catalyst efficiency.

Other preferred operating parameters include:

First stage temperature ............... 900 to 1100° F.
Second stage temperature ............. 500 to 700° F.
First stage space velocity ............. 2 to 5 WHSV.
Second stage space velocity .......... 2 to 10 WHSV.
First stage conversion ................ >70%.
Total product alkylbenzene to benzene
  ratio ................................ >4.

The following examples will serve to illustrate this invention without being in any way limiting thereon. Parts and percentages are by weight unless otherwise expressly stated to the contrary.

EXAMPLE 1

A ZSM-5 catalyst was impregnated with zinc nitrate. The impregnated product was then calcined at 1000° F. for 2 hours to form a 1% zinc composition whereupon 6.5 parts thereof were loaded into a tubular reactor and 28 parts per hour of paraffinic feedstock passed therethrough at a temperature of 1000° F. at a space velocity of 4.3 WHSV. This feedstock analyzed as follows: 57% n-hexane, 32% methylpentanes, 10% methylcyclopentane, and about 1% other $C_6$ and $C_7$ paraffins. The product was recovered and analyzed to contain 52% liquid, of which 94% was aromatic with a $S_7$–$C_{10}$ to $C_6$ ratio of 2.8, and 48% gas which analyzed to be $C_4^-$. The total aromatics yield was 48 parts per 100 parts of aromatizable feedstock.

Example 2

The same feedstock as was used in Example 1 was passed through the same Zn ZSM-5 catalyst at 1000° F. and a space velocity of 4.3 WHSV in first stage and then the product of the first stage passed through the same ZSM-5 catalyst as in the first stage but in the hydrogen form in a second stage at a temperature of 650° F. and a space velocity of 17.2 WHSV. The product was recovered and analyzed to contain 58% liquid and 42% gas. The liquid contained aromatics in a yield of 52 parts per 100 parts of aromatizable feedstock with a $C_7$–$C_{10}$ to $C_6$ ratio of 4.4.

Example 3

Example 1 was repeated under conditions sufficiently severe to yield 52 parts of aromatics per 100 parts of aromatizable feedstock. The temperature was 1000° F. and the space velocity was 2.2 WHSV. The ratio of $C_7$–$C_{10}$ to $C_6$ aromatics in this product was even worse than in Example 1, 2.5.

What is claimed is:

1. In the process of aromatizing petroleum feedstock comprising contacting a feedstock comprising at least one hydrocarbon boiling in the range of $C_2$ to 400° F. with a ZSM-5 type of synthetic aluminosilicate molecular sieve catalyst at about 650 to 1500° F. at a space velocity equivalent to about 1 to 15 WHSV at a conversion of at least about 70% to produce a product yield of at least 30 grams of aromatics per 100 grams of non-aromatics in the feedstock; the improvement, whereby increasing the ratio of $C_7$–$C_{10}$ aromatics to benzene in the product, which comprises contacting said feedstock with a ZSM-5 type catalyst in the substantial absence of added hydrogen in a first stage operating at severe reaction conditions of about 800 to 1500° F., 1 to 35 atmospheres and about 1 to 15 WHSV; then contacting the product of said first stage with a ZSM-5 type catalyst in a second stage under less severe conditions than the first stage of a lower temperature of aboute 500 to 800° F., 1 to 35 atmospheres and a space velocity of about 1 to 20 WHSV; and recovering a liquid product from said second stage having an aromatics yield of at least about 30 grams per 100 grams of non-aromatics in the original feedstock and a ratio of $C_7$–$C_{10}$ aromatics to benzene of at least about 4.

2. The improved process claimed in claim 1 wherein said first stage catalyst is Zn ZSM-5 and said second stage catalyst is HZSM-5.

3. The improved process claimed in claim 2 wherein said second stage catalyst contains a hydrogenation/dehydrogenation component selected from the group consisting of nickel, palladium and rhenium.

4. The improved process claimed in claim 2 wherein the first stage temperature is about 900 to 1100° F. and the second stage temperature is about 500 to 700° F.

5. The improved process claimed in claim 2 wherein said first stage is carried out under aromatization conditions and said second stage is carried out under alkylation conditions.

6. The improved process claimed in claim 2 wherein said first stage operates at 900 to 1100° F., about atmospheric pressure and a space velocity of about 2 to 5 WHSV and said second stage operates at 500 to 700° F., super atmospheric pressure, a hydrogen to hydrocarbon ratio of about 1 to 10, and a space velocity of 2 to 10 WHSV.

7. The improved process claimed in claim 1 wherein the second stage catalyst has a hydrogenation/dehydrogenation component therein.

8. The improved process claimed in claim 7 wherein said second stage catalyst has incorporated therein at least one member selected from the group consisting of nickel, palladium and rhenium.

9. The improved process claimed in claim 1 including mixing reformate or reformer effluent with first stage product and feeding this mixture to the second stage.

10. The improved process claimed in claim 1 including adding hydrogen to said first stage product, pressuring such and feeding such to said second stage where said second stage catalyst contains a hydrogenation dehydrogenation component.

References Cited
UNITED STATES PATENTS

| | | | |
|---|---|---|---|
| 2,781,298 | 2/1957 | Haensel et al. | 208—65 |
| 2,861,942 | 11/1958 | Beckberger | 208—65 |
| 2,902,426 | 9/1959 | Heinemann et al. | 208—65 |
| 3,374,167 | 3/1968 | Craig et al. | 208—138 |
| 3,374,281 | 3/1968 | Csicsery | 260—673 |

DELBERT E. GANTZ, Primary Examiner

J. W. HELLWEGE, Assistant Examiner

U.S. Cl. X.R.

208—65; 260—671, 673.5

UNITED STATES PATENT OFFICE
CERTIFICATE OF CORRECTION

PO-1050
(5/69)

Patent No. 3,761,389   Dated September 25, 1973

Inventor(s) Louis Deane Rollmann

It is certified that error appears in the above-identified patent and that said Letters Patent are hereby corrected as shown below:

Column 2, line 39: "where" should be -- were --

Column 2, line 42: "E" should be -- S --

Column 5, lines 69 to 70: "spefiication" should be -- specification --

Column 6, line 69: -- that the second stage catalyst be HZSM-5 and -- (this was omitted and should be added)

Column 7, line 26: "$S_7$" should be -- $C_7$ --

Signed and sealed this 12th day of March 1974.

(SEAL)
Attest:

EDWARD M. FLETCHER, JR.
Attesting Officer

C. MARSHALL DANN
Commissioner of Patents